United States Patent
Schubert et al.

(10) Patent No.: US 10,218,651 B2
(45) Date of Patent: Feb. 26, 2019

(54) VIRTUAL ASSISTANCE FOR CHAT AGENTS

(71) Applicant: ORACLE INTERNATIONAL CORPORATION, Redwood Shores, CA (US)

(72) Inventors: Aaron Schubert, Bozeman, MT (US); Alexander Van Der Pol, Almere (NL); Iwan Van Staveren, Winkel (NL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 178 days.

(21) Appl. No.: 14/690,565

(22) Filed: Apr. 20, 2015

(65) Prior Publication Data

US 2016/0308799 A1 Oct. 20, 2016

(51) Int. Cl.
*H04L 12/58* (2006.01)
*H04L 29/08* (2006.01)

(52) U.S. Cl.
CPC ............ *H04L 51/046* (2013.01); *H04L 51/02* (2013.01); *H04L 67/22* (2013.01)

(58) Field of Classification Search
CPC ........ H04L 51/046; H04L 51/02; H04L 67/22
USPC ........................................................ 709/206
See application file for complete search history.

(56) References Cited

U.S. PATENT DOCUMENTS

| | | | |
|---|---|---|---|
| 2004/0088300 A1* | 5/2004 | Avery | G06F 9/45512 |
| 2004/0162724 A1* | 8/2004 | Hill | G10L 15/1822 704/231 |
| 2005/0105712 A1* | 5/2005 | Williams | G10L 13/027 379/265.02 |
| 2005/0251440 A1* | 11/2005 | Bednarek | G06Q 30/0201 705/7.32 |
| 2007/0260530 A1* | 11/2007 | Lewis-Hawkins | G06Q 30/016 705/7.29 |
| 2009/0228264 A1* | 9/2009 | Williams | G10L 13/027 704/9 |

(Continued)

FOREIGN PATENT DOCUMENTS

WO     WO 02/09399     *  1/2002  ............. H04M 3/00

OTHER PUBLICATIONS

U.S. Appl. No. 62/121,137, filed Feb. 2015, Beasley et al.*

Primary Examiner — James E Springer
(74) Attorney, Agent, or Firm — Kraguljac Law Group, LLC

(57) ABSTRACT

Embodiments of the present invention employ a virtual assistant for use by a live agent during a session while traditional virtual assistant applications interact directly with the customer contact. According to one embodiment, the virtual assistant content can be displayed to the live agent alongside the chat window, for example in a side-by-side layout. Buttons and/or shortcut keys can also be provided which would allow the agent to "promote" the virtual assistant response to the chat session. In such cases, the virtual assistant answer or response can be moved to the chat panel and be sent to the customer. This approach can leverage the virtual assistant to make live agents more efficient by providing answers to questions that keep the live agent from having to look them up or even type the answer at all. This approach can also provide a more consistent service experience between customers and between sessions.

20 Claims, 10 Drawing Sheets

(56) References Cited

U.S. PATENT DOCUMENTS

| | | | |
|---|---|---|---|
| 2011/0141919 A1* | 6/2011 | Singh | H04L 41/0681 370/252 |
| 2013/0003943 A1* | 1/2013 | Munns | H04M 3/5166 379/88.01 |
| 2013/0039483 A1* | 2/2013 | Wolfeld | H04M 3/00 379/265.03 |
| 2013/0129076 A1* | 5/2013 | Kannan | H04M 3/5175 379/265.09 |
| 2014/0059057 A1* | 2/2014 | McFarlane | G06F 17/30864 707/749 |
| 2014/0140497 A1* | 5/2014 | Ripa | H04M 3/5133 379/265.06 |
| 2014/0255895 A1* | 9/2014 | Shaffer | G09B 7/02 434/350 |
| 2014/0270145 A1* | 9/2014 | Erhart | H04M 3/523 379/265.13 |
| 2014/0362984 A1* | 12/2014 | Danson | H04M 3/5175 379/265.06 |
| 2015/0039521 A1* | 2/2015 | Schubert | G06Q 30/016 705/304 |
| 2015/0256675 A1* | 9/2015 | Sri | H04M 3/5183 379/265.09 |
| 2016/0117147 A1* | 4/2016 | Zambetti | G06F 3/0236 715/727 |
| 2016/0132812 A1* | 5/2016 | Beasley | G06Q 10/06393 705/7.39 |
| 2016/0180737 A1* | 6/2016 | Clark | G09B 19/00 434/236 |
| 2016/0189558 A1* | 6/2016 | McGann | G09B 5/06 434/219 |
| 2016/0274962 A1* | 9/2016 | Fortune | G06F 11/079 |
| 2016/0295018 A1* | 10/2016 | Loftus | H04M 3/5175 |
| 2016/0358240 A1* | 12/2016 | Redfern | G06Q 30/0619 |
| 2017/0180276 A1* | 6/2017 | Gershony | H04L 51/02 |
| 2017/0235740 A1* | 8/2017 | Seth | G06F 17/3064 707/738 |
| 2018/0083894 A1* | 3/2018 | Fung | H04L 51/02 |

\* cited by examiner

VIRTUAL ASSISTANCE FOR CHAT AGENTS

BACKGROUND OF THE INVENTION

Embodiments of the present invention relate generally to methods and systems for using a virtual assistant in an interaction and more particularly to providing virtual assistance on a contact agent interaction during a live chat session.

Customer Relationship Management (CRM) systems or other contact center systems provide support for customers of a product or service by allowing those users to make requests for service that can include a question posed by the user related to the product or service. Generally speaking, these systems receive requests for service, e.g., in the form of a phone call, web page form, instant message, email, etc., and route the requests to either a virtual agent or live, human agent for addressing the request and providing an answer to the question. For example, a chat or other session can be conducted between the customer and an automated virtual agent which guides the interaction based on a set of scripts and a knowledgebase related to the topic of the contact. In other cases, a chat session can be initiated between the customer and the live agent who can interact directly with the customer over any one or more of the available channels, e.g., web chat, instant message, email exchange, etc.

However, current approaches maintain a clear distinction or separation between live agent chat solutions and virtual assistant solutions. The arguments for each are pretty clear. Virtual assistants provide lower overhead since there is not a need to employ as many chat agents. Virtual agents also ensure that customers are getting a consistent experience which isn't always the case when using live, human agents. However, there are situations or questions a virtual assistant can't answer. Furthermore, many customers prefer interacting with an actual human. Currently, these systems do not effectively provide the benefits of both approaches in a way that seamlessly integrates both a virtual agent and a live agent into a particular session. Hence, there is a need for improved methods and systems for using a virtual assistant in an interaction.

BRIEF SUMMARY OF THE INVENTION

Embodiments of the invention provide systems and methods for providing virtual assistance on a contact agent interaction during a live chat session. According to one embodiment, providing virtual assistance on a contact agent interaction during a live chat session can comprise selecting a mode of operation from a plurality of modes of operation for the virtual assistant. The plurality of modes can include but are not limited to a live mode, a training mode, a hidden live mode, and a hidden test mode. The virtual assistant can be launched in the selected mode of operation and a chat session involving a live agent can be conducted using the virtual assistant. Conducting the chat session using the virtual assistant can vary depending upon the selected mode. However in each mode, performance of the virtual assistant and the live agent can be tracked during the chat session.

When the selected mode comprises a live mode, conducting the chat session using the virtual assistant can comprise receiving a customer contact and initiating the chat session between the customer contact and the live agent. The chat session can be conducted with the virtual assistant providing answers to the live agent during and based on the chat session. For example, the virtual assistant answers can be presented or made available to the live agent through an interface and through which the agent may select to use the answer as provided by the virtual assistant, use the answer provided by the virtual assistant but with some modifications, or use a different answer. So for example, conducting the chat session can further comprise providing the answer from the virtual assistant to the customer contact without modification in response to receiving an indication from the live agent. Alternatively, conducting the chat session can further comprise providing the answer from the virtual assistant to the customer contact with modification by the live agent in response to receiving an indication from the live agent. In such cases, tracking performance of the virtual assistant and the live agent during the chat session can comprise tracking use by the live agent of the answers provided by the virtual assistant as well as any differences between the answers.

When the selected mode comprises a training mode, conducting the chat session using the virtual assistant can comprise initiating the chat session between a trainer and the live agent. The trainer can comprise another live agent or person or an automated script or application. In either case, the chat session can be conducted with the virtual assistant providing answers to the live agent during and based on the chat session. Tracking performance of the virtual assistant and the live agent during the chat session can comprise tracking use by the live agent of the answers provided by the virtual assistant and differences between answers provided by the live agent and the answers provided by the virtual assistant.

When the selected mode comprises a hidden live mode, conducting the chat session using the virtual assistant can comprise receiving a customer contact, initiating the chat session between the customer contact and the live agent, and conducting the chat session between the customer contact and the live agent. Answers can be generated by the virtual assistant during and based on the chat session but without providing the answers to the live agent, i.e., the answers are hidden from the live agent. Tracking performance of the virtual assistant and the live agent during the chat session can comprise tracking differences between answers provided by the live agent and the answers generated by the virtual assistant.

When the selected mode comprises a hidden training mode, conducting the chat session using the virtual assistant can comprise initiating the chat session between a trainer and the live agent and conducting the chat session between the trainer and the live agent. The trainer can comprise another live agent or person or an automated script or application. In either case, answers can be generated by the virtual assistant during and based on the chat session but without providing the answers to the live agent, i.e., the answers are hidden from the live agent. Tracking performance of the virtual assistant and the live agent during the chat session can comprise tracking differences between answers provided by the live agent and the answers generated by the virtual assistant.

DETAILED DESCRIPTION OF THE INVENTION

Figure 1:
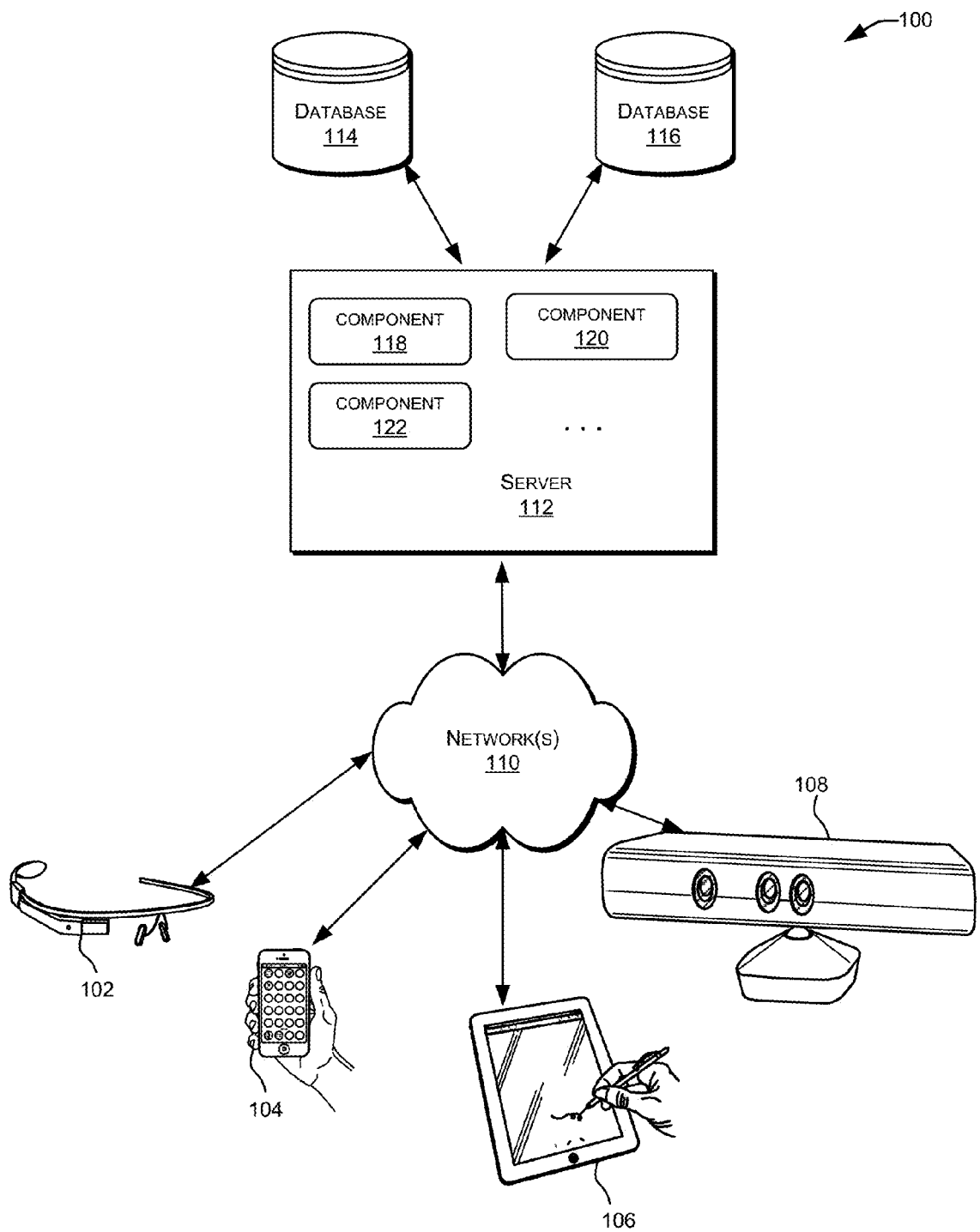
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing virtual assistance to a contact agent during a live chat session. More specifically, embodiments of the present invention employ a virtual assistant for use by a live agent during a session while traditional virtual assistant applications interact directly with the customer contact. According to one embodiment, the virtual assistant content can be displayed to the live agent alongside the chat window, for example in a side-by-side layout. Buttons and/or shortcut keys can also be provided which would allow the agent to "promote" the virtual assistant response to the chat session. In such cases, the virtual assistant answer or response can be moved to the chat panel and be sent to the customer. This approach can leverage the virtual assistant to make live agents more efficient by providing answers to questions that keep the live agent from having to look them up or even type the answer at all. This approach can also provide a more consistent service experience between customers and between sessions.

According to one embodiment, the system can also track important data such as how often a live agent promotes a virtual assistant response to the customer. This can give managers feedback as to the effectiveness of the virtual assistant implementation and can allow them to continually improve. The system can also track the virtual assistant suggestion against the answer the agent provided so that the data can be mined and later reviewed to see where the gaps in the system are. The system can flag cases as suspect where the virtual assistant response was not promoted but the agent response was very close since some agents may not want to promote the virtual assistant response. In traditional virtual assistant deployments, it is hard to identify when a virtual assistant response is inappropriate. In some cases, customers may just leave the chat which may be construed as a correct answer. In other cases, they may ask follow-up questions which are still hard to identify as something new or, once again, whether the response was inappropriate. Embodiments provide expert, real-world tuning for the virtual assistant which could be done as part of an algorithm (automatically incorporate the agent responses into virtual assistant) or reviewed manually by managers to determine what needs to change. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112.

Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
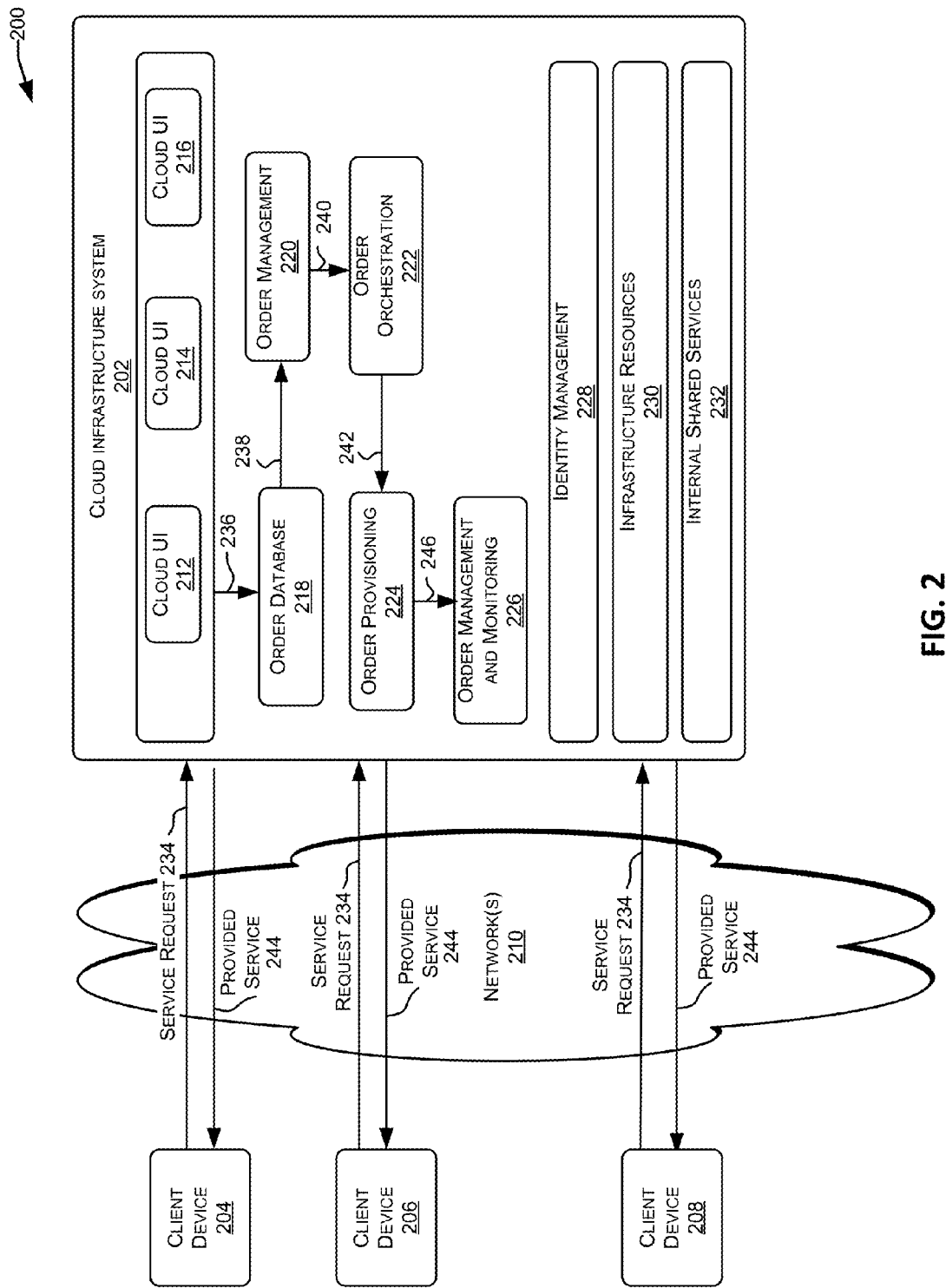
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
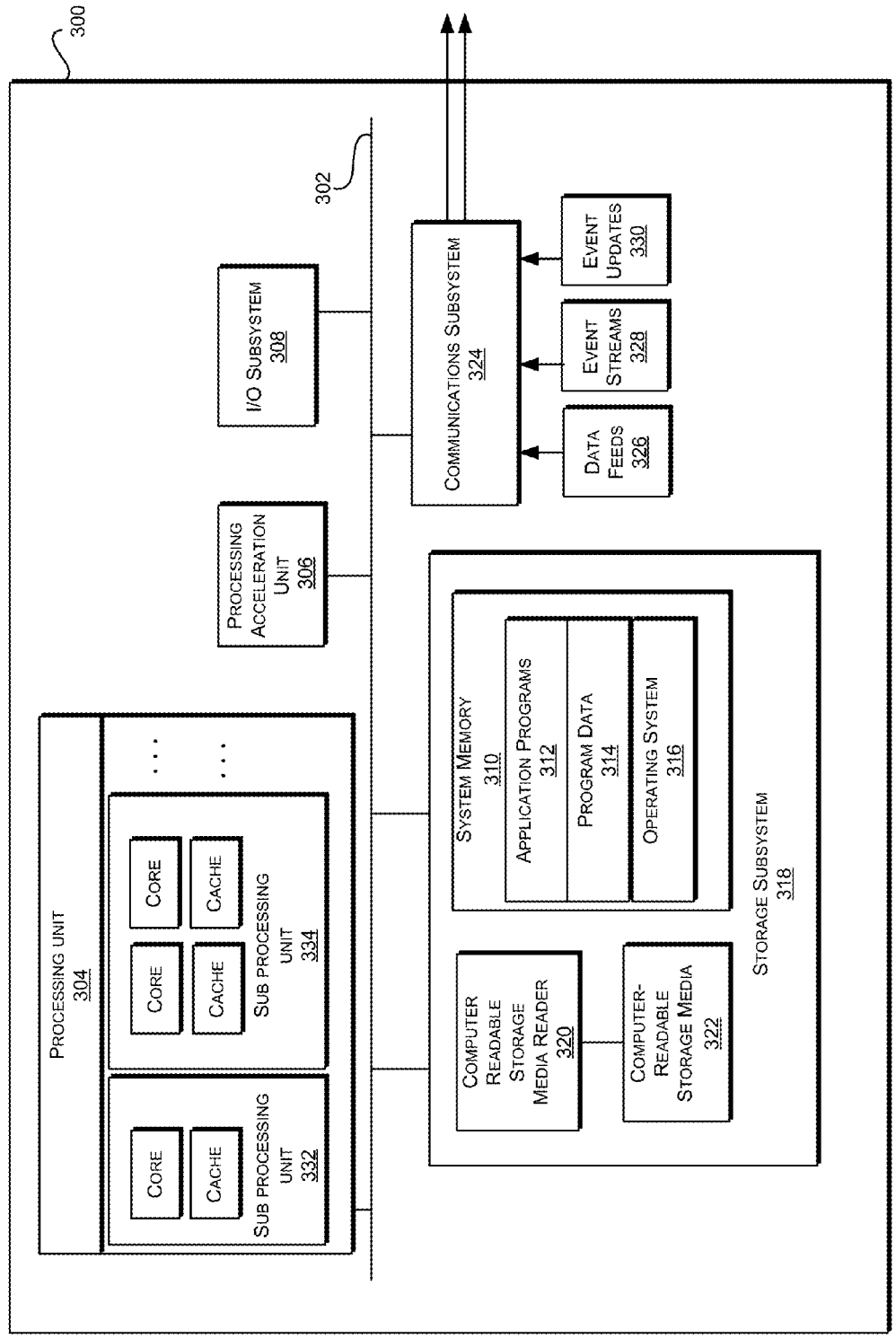
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
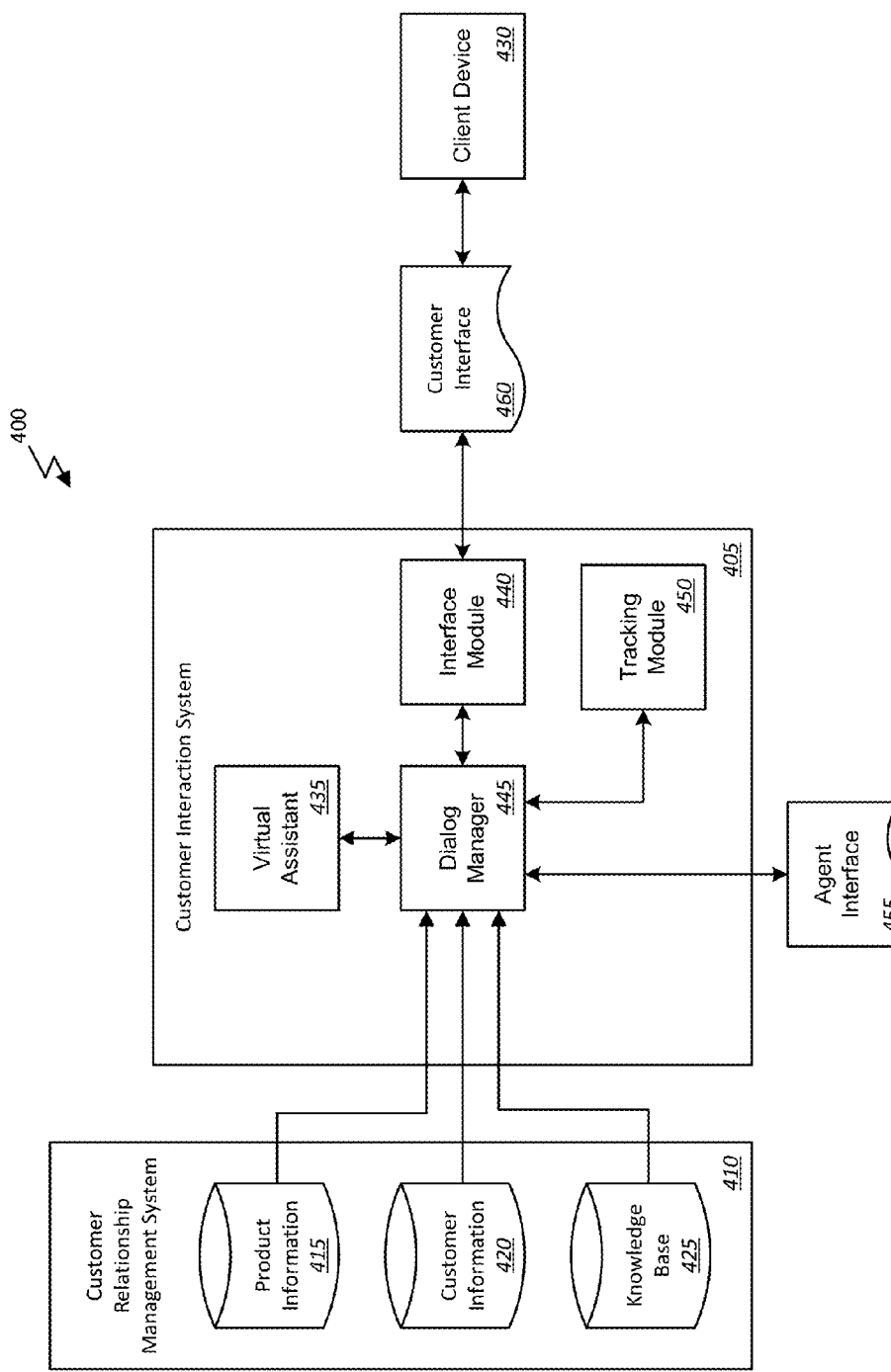
FIG. 4 is a block diagram illustrating, at a high-level, functional components of a system for providing a virtual assistant to a contact agent during a live chat session according to one embodiment of the present invention.

FIG. 4 is a block diagram illustrating, at a high-level, functional components of a system for providing a virtual assistant to a contact agent during a live chat session according to one embodiment of the present invention. In this example, the system 400 includes a customer interaction system 405 and a Customer Relationship Management (CRM) system 410, each of which can be implemented by or on any one or more servers or other computer systems such as described above. It should be noted that, while illustrated here as separate, the CRM system 410 and customer interaction system 405 may, depending upon the exact implementation, be provided by the same system or set of systems. Generally speaking, CRM system 410 and customer interaction system 405 can operate in conjunction to provide support for customers of a product or service by allowing those users to make requests for service, report problems with those products or services, search for information, etc.

More specifically, the customer interaction system 405 provides for managing an interaction with a customer using a client device 430 such as a personal computer, tablet, cell phone, or any other computing device. For example, the customer interaction system 405 can include an interface module 440 for interfacing with a customer interface 460, such as a web page, through which the client device 430 may access the customer interaction system 405 via a communication channel such as the Internet or other local or wide area network as described above.

The customer interaction system 405 can also include a dialog manager 445. Generally speaking, the dialog manager 445 can provide an agent interface 455 to a live, human customer service agent and help to manage an interaction between the agent and the customer. Managing the interaction can comprise receiving at the customer interaction system 405 a request from the customer to initiate an interaction between the agent and the customer. For example, the request to initiate the interaction can comprise a request from the client device 430 through the interface module 440. In other cases, the request can be received from a customer service agent using the CRM system, an automatically generated request based on the occurrence of a triggering event, etc. During this interaction, the dialog manager 445 can retrieve or provide access to information that may be useful to the agent and/or the customer. For example, the retrieved information can comprise one or more of customer information 420 related to the customer participating in the exchange, product information 415 related to the product or service that is the subject of the interaction, and/or knowledge base 425 information from a CRM system 410, or other information.

According to one embodiment, the customer interaction system 405 can also execute a virtual assistant 435. The virtual assistant 435 can comprise any of a variety of possible forms of automated assistant or guides for directing or aiding in an interactive communication with the customer by providing answers to agent through the agent interface 455. The agent can then use that answer in the exchange with the customer, i.e., promote the virtual assistant answer and provide it to the customer, edit the answer provided by the virtual assistant 435 before providing it to the customer, or disregard that answer and provide a different answer through the agent interface 455 which will then be provided to the customer via the customer interface 460. So instead of providing answers directly to the customer, the virtual assistant 435 can provide answers to the agent through the dialog manager 445 and agent interface 455. These answers can be presented in a dialog of agent interface 455, e.g., side-by-side with the ongoing chat or in another format that provides an easy, clear way for the agent to quickly review the answers and promote or edit those answers or provide different answers. For example, the interface may allow the agent to click a button or otherwise quickly and easily promote the displayed virtual assistant answer. An example of such an interface will be described in greater detail below. Additionally or alternatively, a time limit may be defined after which the virtual assistant answer can be automatically promoted to the customer if the agent hasn't done anything. Chat agents are usually expected to be having multiple chats at once. This would allow them to have even more chats going and basically be in a mode where they are reviewing the virtual assistant and only taking action on a particular chat if they see something wrong. In that case, the no action would mean things are good and the virtual assistant should just continue to promote the answers to the customer.

According to one embodiment, the virtual assistant 435 can operate in one or a number of different modes. For example, these modes can include a live mode as described above in which the virtual assistant 435 provides answers to the agent for possible use in an ongoing session with the customer. In some cases, the modes can include a training mode. In such a mode, the answers provided by the virtual assistant 435 can be used for training the agent. For example, answers provided by the virtual assistant 435 can be provided to the agent for use in a session with a live customer contact (similar to live mode) or in an interaction with a trainer. The trainer may comprise a live, human contact such as another agent or supervisor acting as a customer contact or an automated training script or program. Additionally or alternatively, the training mode can be used for training or tuning of the virtual assistant 435. For example, changes to the virtual assistant answers made by the agent can be used for tuning of the virtual assistant such as by correcting spelling, grammar, phrasing, etc. In either the live mode or the training mode, the virtual assistant 435 may also be operated in a hidden mode. In other words, the virtual assistant 435 may generate answers as described above but, rather than presenting those answers to the agent, may record them for further processing. This further processing can include comparing the virtual assistant responses with that of the agent and either tuning the virtual assistant or furthering the training of agents to make sure they are providing proper service responses.

According to one embodiment, a tracking module 450 of the customer interaction system 405 may be used to record the answers of the virtual assistant 435 in any of the modes described above. In addition to or instead of the answers, the tracking module 450 may track any of a variety of different metrics related to the operation of the virtual assistant 435 and the use of the answers generated thereby. For example, the metrics can include but are not limited to metrics related to promotions, e.g., how often the virtual assistant answer is promoted, in which situations is it promoted or not promoted, how long it took for the agent to promote the answer, etc. Other metrics can include but are not limited to information indicating whether the agent did not promote the virtual assistant answer but gave the same or a similar answer. Such similar responses can be flagged for further evaluation to determine whether the virtual assistant answer is not quite right (e.g., incorrect spelling grammar, phrasing, etc.) or whether the agent is just not promoting virtual assistant answers. Such tracking can thus provide for evaluation of agent against the virtual assistant or, conversely, evaluation of the virtual assistant against the agent. Additionally or alternatively, the information collected through such tracking can be used in a variety of other ways. For example, at the end of a chat further action may be needed. For example, the agent may create a service request for the customer. At that time, the chat transcript can be loaded into the service request. According to one embodiment, that transcript may show which responses came from the agent and which were from the virtual assistant. T information may be internally facing because the customer assumes they are just interacting with a person. However, such information can be useful for the eventual agent working the service request as they may identify misinformation and they would know if they need to contact the original agent or the content administrator for correction of the virtual assistant.

Stated another way, providing virtual assistance on a contact agent interaction during a live chat session can comprise selecting a mode of operation from a plurality of modes of operation for the virtual assistant. The plurality of modes can include but are not limited to a live mode, a training mode, a hidden live mode, and a hidden test mode. The virtual assistant 435 can be launched in the selected mode of operation and a chat session involving a live agent can be conducted by the dialog manager 445 using the virtual assistant 435. Conducting the chat session by the dialog manager 445 using the virtual assistant 435 can vary depending upon the selected mode. However in each mode, performance of the virtual assistant 435 and the live agent can be tracked by the tracking module 450 during the chat session.

When the selected mode comprises a live mode, conducting the chat session by the dialog manager 445 using the virtual assistant 435 can comprise receiving a customer contact and initiating the chat session between the customer contact and the live agent. The chat session can be conducted by the dialog manager 445 with the virtual assistant 435 providing answers to the live agent during and based on the chat session. For example, the virtual assistant answers can be presented or made available to the live agent through an interface 455 as described below and through which the agent may select to use the use the answer as provided by the virtual assistant 435, use the answer provided by the virtual assistant 435 but with some modifications, or use a different answer. So for example, conducting the chat session can further comprise providing the answer from the virtual assistant 435 to the customer contact without modification in response to receiving an indication from the live agent or an expiration of a time limit. Alternatively, conducting the chat session can further comprise providing the answer from the virtual assistant 435 to the customer contact with modification by the live agent in response to receiving an indication from the live agent. In such cases, tracking performance of the virtual assistant 435 and the live agent during the chat session can comprise the tracking module 450 tracking use by the live agent of the answers provided by the virtual assistant 435 as well as any differences between the answers.

When the selected mode comprises a training mode, conducting the chat session by the dialog manager 445 using the virtual assistant 435 can comprise initiating the chat session between a trainer and the live agent. The trainer can comprise another live agent or person or an automated script or application. In either case, the chat session can be conducted with the virtual assistant 435 providing answers to the live agent during and based on the chat session. Tracking performance of the virtual assistant and the live agent by the tracking module 450 during the chat session can comprise tracking use by the live agent of the answers provided by the virtual assistant 435 and differences between answers provided by the live agent and the answers provided by the virtual assistant 435.

When the selected mode comprises a hidden live mode, conducting the chat session by the dialog manager 445 using the virtual assistant 435 can comprise receiving a customer contact, initiating the chat session between the customer contact and the live agent, and conducting the chat session between the customer contact and the live agent. Answers can be generated by the virtual assistant 435 during and based on the chat session but without providing the answers to the live agent, i.e., the answers are hidden from the live agent. Tracking performance of the virtual assistant 435 and the live agent by the tracking module 450 during the chat session can comprise tracking differences between answers provided by the live agent and the answers generated by the virtual assistant 435.

When the selected mode comprises a hidden training mode, conducting the chat session by the dialog manager 445 using the virtual assistant 435 can comprise initiating the chat session between a trainer and the live agent and conducting the chat session between the trainer and the live agent. The trainer can comprise another live agent or person or an automated script or application. In either case, answers can be generated by the virtual assistant 435 during and based on the chat session but without providing the answers to the live agent, i.e., the answers are hidden from the live agent. Tracking performance of the virtual assistant and the live agent during the chat session by the tracking module 450 can comprise tracking differences between answers provided by the live agent and the answers generated by the virtual assistant 435.

Figure 5:
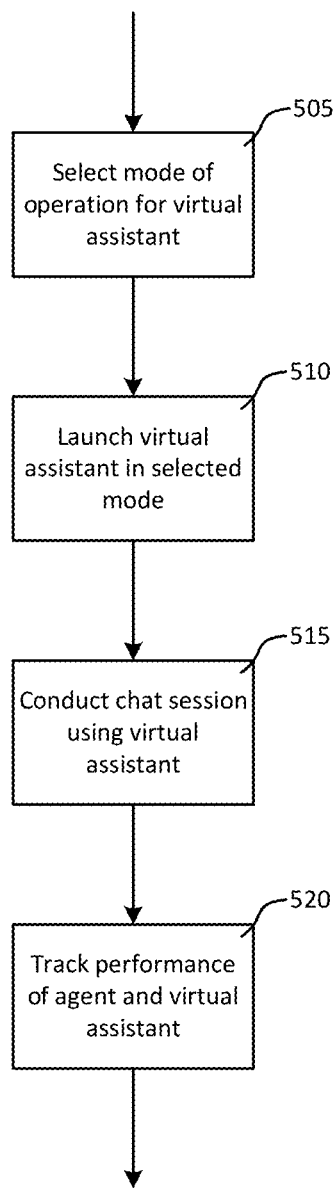
FIG. 5 is a flowchart illustrating a process for providing virtual assistance on a contact agent interaction during a live chat session according to one embodiment of the present invention.

FIG. 5 is a flowchart illustrating a process for providing virtual assistance on a contact agent interaction during a live chat session according to one embodiment of the present invention. As illustrated in this example, providing virtual assistance on a contact agent interaction during a live chat session can comprise selecting 505 a mode of operation from a plurality of modes of operation for a virtual assistant. The plurality of modes can include but are not limited to a live mode, a training mode, a hidden live mode, and a hidden test mode. The virtual assistant can be launched 510 in the selected mode of operation and a chat session involving a live agent can be conducted 515 using the virtual assistant. As will be described, conducting 515 the chat session using the virtual assistant can vary depending upon the selected mode. However in each mode, performance of the virtual assistant and the live agent can be tracked 520 during the chat session.

Figure 6:
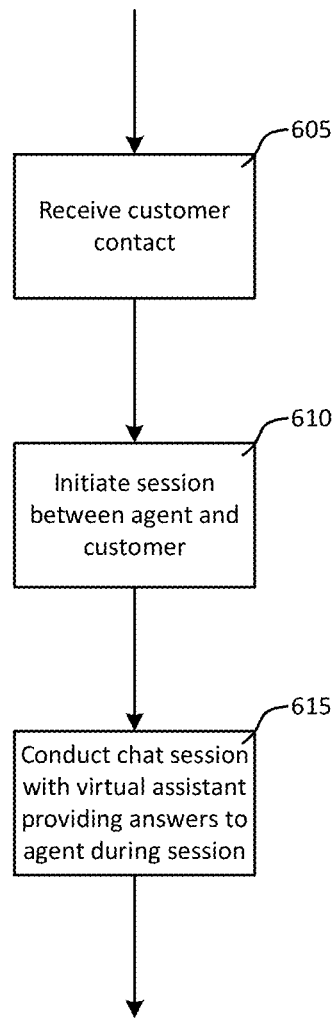
FIG. 6 is a flowchart illustrating additional details of conducting a chat session using a virtual assistant in a live mode according to one embodiment of the present invention.

FIG. 6 is a flowchart illustrating additional details of conducting a chat session using a virtual assistant in a live mode according to one embodiment of the present invention. As illustrated in this example, when the selected mode comprises a live mode, conducting the chat session using the virtual assistant can comprise receiving 605 a customer contact and initiating 610 the chat session between the customer contact and the live agent. The chat session can be conducted 615 with the virtual assistant providing answers to the live agent during and based on the chat session.

For example, the virtual assistant answers can be presented or made available to the live agent through an interface as described below and through which the agent may select to use the use the answer as provided by the virtual assistant, use the answer provided by the virtual assistant but with some modifications, or use a different answer. So for example, conducting the chat session can further comprise providing the answer from the virtual assistant to the customer contact without modification in response to receiving an indication from the live agent. Alternatively, conducting the chat session can further comprise providing the answer from the virtual assistant to the customer contact with modification by the live agent in response to receiving an indication from the live agent. In such cases, tracking performance of the virtual assistant and the live agent during the chat session can comprise tracking use by the live agent of the answers provided by the virtual assistant as well as any differences between the answers.

Figure 7:
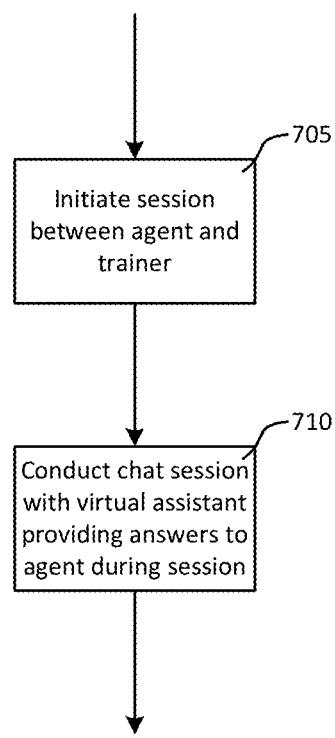
FIG. 7 is a flowchart illustrating additional details of conducting a chat session using a virtual assistant in a training mode according to one embodiment of the present invention.

FIG. 7 is a flowchart illustrating additional details of conducting a chat session using a virtual assistant in a training mode according to one embodiment of the present invention. As illustrated in this example, when the selected mode comprises a training mode, conducting the chat session using the virtual assistant can comprise initiating 705 the chat session between a trainer and the live agent. The trainer can comprise another live agent or person or an automated script or application. In either case, the chat session can be conducted 710 with the virtual assistant providing answers to the live agent during and based on the chat session. Tracking performance of the virtual assistant and the live agent during the chat session can comprise tracking use by the live agent of the answers provided by the virtual assistant and differences between answers provided by the live agent and the answers provided by the virtual assistant.

Figure 8:
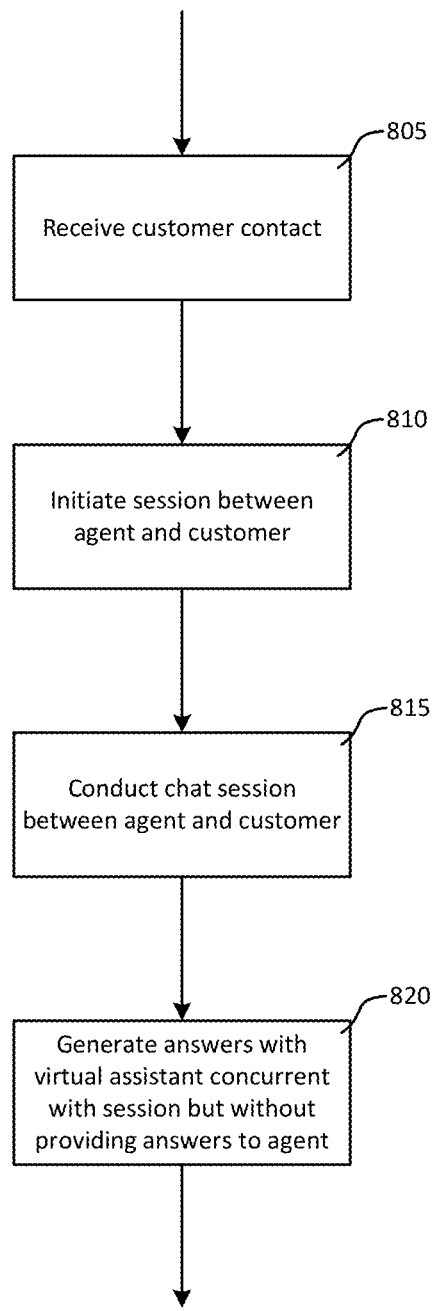
FIG. 8 is a flowchart illustrating additional details of conducting a chat session using a virtual assistant in a hidden live mode according to one embodiment of the present invention.

FIG. 8 is a flowchart illustrating additional details of conducting a chat session using a virtual assistant in a hidden live mode according to one embodiment of the present invention. As illustrated in this example, when the selected mode comprises a hidden live mode, conducting the chat session using the virtual assistant can comprise receiving 805 a customer contact, initiating 810 the chat session between the customer contact and the live agent, and conducting 815 the chat session between the customer contact and the live agent. Answers can be generated 820 by the virtual assistant during and based on the chat session but without providing the answers to the live agent, i.e., the answers are hidden from the live agent. Tracking performance of the virtual assistant and the live agent during the chat session comprises tracking differences between answers provided by the live agent and the answers generated by the virtual assistant.

Figure 9:
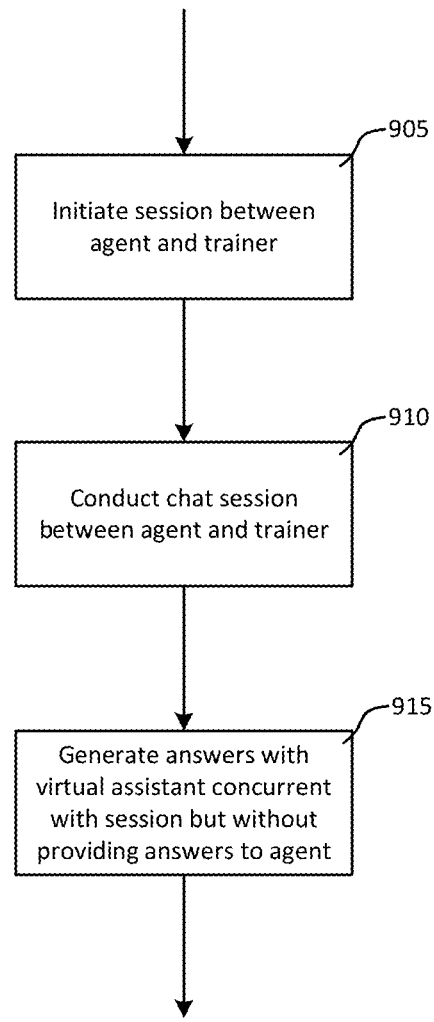
FIG. 9 is a flowchart illustrating additional details of conducting a chat session using a virtual assistant in a hidden training mode according to one embodiment of the present invention.

FIG. 9 is a flowchart illustrating additional details of conducting a chat session using a virtual assistant in a hidden training mode according to one embodiment of the present invention. As illustrated in this example, when the selected mode comprises a hidden training mode, conducting the chat session using the virtual assistant can comprise initiating 905 the chat session between a trainer and the live agent and conducting 910 the chat session between the trainer and the live agent. The trainer can comprise another live agent or person or an automated script or application. In either case, answers can be generated 915 by the virtual assistant during and based on the chat session but without providing the answers to the live agent, i.e., the answers are hidden from the live agent. Tracking performance of the virtual assistant and the live agent during the chat session comprises tracking differences between answers provided by the live agent and the answers generated by the virtual assistant.

Figure 10:
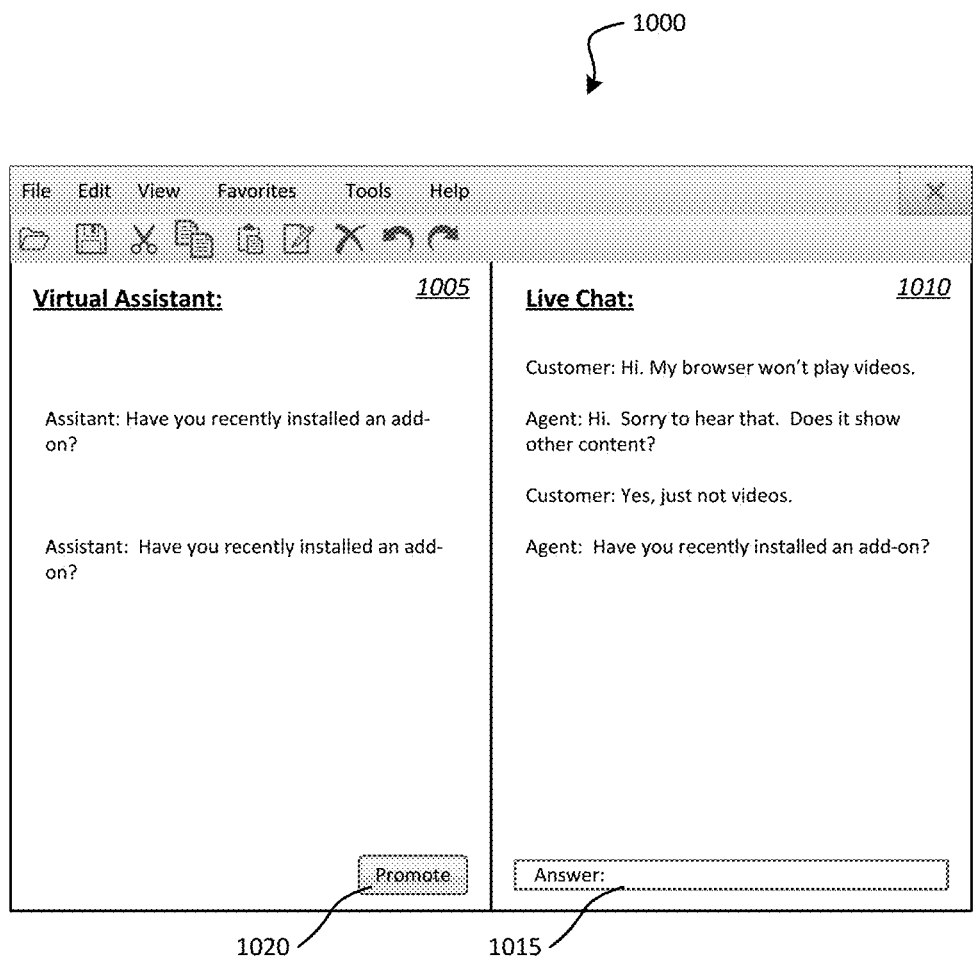
FIG. 10 is an exemplary user interface for providing virtual assistance on a contact agent interaction during a live chat session according to one embodiment of the present invention.

FIG. 10 is an exemplary user interface for providing virtual assistance on a contact agent interaction during a live chat session according to one embodiment of the present invention. More specifically, this example illustrates an interface 1000 such as a web page or other presentation that can be provided to an agent during a chat session such as described above. As noted, embodiments of the present invention employ a virtual assistant for use by the live agent during a session while traditional virtual assistant applications interact directly with the customer contact. According to one embodiment, the virtual assistant content 1005 can be displayed to the live agent in a split pane or frame alongside the chat session content 1010, for example in a side-by-side layout. A button 1020, shortcut key or other control can also be provided which would allow the agent to "promote" the virtual assistant response to the chat session. In such cases, the virtual assistant answer or response can be moved to the chat panel 1010 and be sent to the customer. Alternatively, the virtual assistant answer or response can be moved to a textbox 1015 of the chat panel through which the agent typically types responses to allow the agent to edit the virtual assistant answer before sending it to the customer. This approach can leverage the virtual assistant to make live agents more efficient by providing answers to questions that keep the live agent from having to look them up or even type the answer at all. This approach can also provide a more consistent service experience between customers and between sessions. It should be noted and understood that the interface 1000 illustrated and described here is provided by way of example only and is not intended to limit the scope of the present invention. Rather, the interface may vary significantly in both format and in content depending upon the exact implementation and without departing from the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing virtual assistance on a contact agent interaction during a live chat session, the method comprising:
    selecting a mode of operation from a plurality of modes of operation for a virtual assistant, wherein the plurality of modes of operation comprise a live mode, a training mode, a hidden live mode, and a hidden training mode;
    launching the virtual assistant in the selected mode of operation;
    operating the virtual assistant in the selected mode of operation, the operating comprising:
        displaying a graphical user interface on a device of a live agent;
        receiving a request in a chat session displayed in the graphical user interface;
        receiving, from the virtual assistant, a suggested response to the request;
        when the selected mode of operation is the training mode or the live mode:
            updating a first portion of the graphical user interface with the suggested response and a promote button; and
            updating a second portion of the graphical user interface with a given response from the live agent in the chat session;
            wherein:
                the graphical user interface comprises the first portion for display of information from the virtual assistant and the second portion for display of the chat session;
                the first portion and the second portion are displayed simultaneously; and
                selection of the promote button provides the suggested response via the chat session displayed in the graphical user interface and updates the second portion of the graphical user interface with the suggested response;
        when the selected mode of operation is the hidden live mode or the hidden training mode:
            updating the second portion of the graphical user interface with the given response from the live agent in the chat session; and
            tracking a difference between the given response and the suggested response;
            wherein:
                the graphical user interface comprises the second portion for display of the chat session; and
                the suggested response is not provided to the live agent or displayed in the first portion; and
    tracking performance of the virtual assistant and the live agent during the chat session.

2. The method of claim 1, wherein the first portion and the second portion are displayed side-by-side in the graphical user interface when the selected mode of operation is the live mode or the training mode.

3. The method of claim 2, further comprising, in response to receiving an indication of selection of the promote button from the live agent, sending the suggested response from the virtual assistant without modification.

4. The method of claim 2, further comprising, in response to receiving an indication from the live agent, providing the given response, the given response being the suggested response with modification by the live agent.

5. The method of claim 1, wherein the training mode is the selected mode of operation, the training mode used to train the live agent using the suggested response from the virtual assistant.

6. The method of claim 1, wherein the given response is used to train the virtual assistant.

7. The method of claim 1, wherein tracking performance of the virtual assistant and the live agent during the chat session comprises tracking use by the live agent of the suggested response when the selected mode of operation is the live mode or the training mode.

8. A system comprising:
    a processor; and
    a memory coupled with and readable by the processor and storing therein a set of instructions which, when executed by the processor, causes the processor to provide virtual assistance on a contact agent interaction during a live chat session by:
        receiving a selection of a mode of operation from a plurality of modes of operation for a virtual assistant, wherein the plurality of modes of operation comprise a live mode, a training mode, a hidden live mode, and a hidden training mode;
        launching the virtual assistant in the selected mode of operation;
        operating the virtual assistant in the selected mode of operation, the operating comprising:
            providing a graphical user interface to a device of a live agent;
            receiving a request in a chat session displayed in the graphical user interface;
            receiving, from the virtual assistant, a suggested response to the request;
            when the selected mode of operation is the training mode or the live mode:
                updating a first portion of the graphical user interface with the suggested response and a promote button; and
                updating a second portion of the graphical user interface with a given response from the live agent in the chat session;
                wherein:
                    the graphical user interface comprises the first portion for display of information from the virtual assistant and the second portion for display of the chat session;
                    the first portion and the second portion are displayed simultaneously; and
                    selection of the promote button provides the suggested response via the chat session displayed in the graphical user interface and updates the second portion of the graphical user interface with the suggested response;

when the selected mode of operation is the hidden live mode or the hidden training mode:
updating the second portion of the graphical user interface with the given response from the live agent in the chat session; and
tracking a difference between the given response and the suggested response;
wherein:
the graphical user interface comprises the second portion for display of the chat session; and
the suggested response is not provided to the live agent or displayed in the first portion; and
tracking performance of the virtual assistant and the live agent during the chat session.

9. The system of claim 8, wherein the first portion and the second portion are displayed side-by-side in the graphical user interface when the selected mode of operation is the live mode or the training mode.

10. The system of claim 9, wherein the set of instructions comprises further instructions which, when executed by the processor, causes the processor to provide virtual assistance on a contact agent interaction during a live chat session by:
in response to receiving an indication of selection of the promote button from the live agent, sending the suggested response from the virtual assistant without modification.

11. The system of claim 9, wherein the set of instructions comprises further instructions which, when executed by the processor, causes the processor to provide virtual assistance on a contact agent interaction during a live chat session by:
in response to receiving an indication from the live agent, sending the suggested response from the virtual assistant with modification by the live agent.

12. The system of claim 9, wherein the training mode is the selected mode of operation, the training mode used to train the live agent using the suggested response from the virtual assistant.

13. The system of claim 8, wherein the given response is used to train the virtual assistant.

14. The system of claim 8, wherein tracking performance of the virtual assistant and the live agent during the chat session comprises tracking use by the live agent of the suggested response when the selected mode of operation is the live mode or the training mode.

15. A computer-readable memory comprising a set of instructions stored therein which, when executed by a processor, causes the processor to provide virtual assistance on a contact agent interaction during a live chat session by:
receiving a selection of a mode of operation from a plurality of modes of operation for a virtual assistant, wherein the plurality of modes of operation comprise a live mode, a training mode, a hidden live mode, and a hidden training mode;
launching the virtual assistant in the selected mode of operation;
operating the virtual assistant in the selected mode of operation, the operating comprising:
providing a graphical user interface to a device of a live agent;
receiving a request in a chat session displayed in the graphical user interface;
receiving, from the virtual assistant, a suggested response to the request;
when the selected mode of operation is the training mode or the live mode:
updating a first portion of the graphical user interface with the suggested response and a promote button; and
updating a second portion of the graphical user interface with a given response from the live agent in the chat session;
wherein:
the graphical user interface comprises the first portion for display of information from the virtual assistant and the second portion for display of the chat session;
the first portion and the second portion are displayed simultaneously; and
selection of the promote button provides the suggested response via the chat session displayed in the graphical user interface and updates the second portion of the graphical user interface with the suggested response;
when the selected mode of operation is the hidden live mode or the hidden training mode:
updating the second portion of the graphical user interface with the given response from the live agent in the chat session; and
tracking a difference between the given response and the suggested response;
wherein:
the graphical user interface comprises the second portion for display of the chat session;
the suggested response is not provided to the live agent or displayed in the first portion; and
tracking performance of the virtual assistant and the live agent during the chat session.

16. The computer-readable memory of claim 15, wherein the first portion and the second portion are displayed side-by-side in the graphical user interface when the selected mode of operation is the live mode or the training mode.

17. The computer-readable memory of claim 16, wherein the set of instructions comprises further instructions which, when executed by the processor, causes the processor to provide virtual assistance on a contact agent interaction during a live chat session by:
in response to receiving an indication of selection of the promote button from the live agent, sending the suggested response from the virtual assistant without modification.

18. The computer-readable memory of claim 16, wherein the training mode is the selected mode of operation, the training mode used to train the live agent using the suggested response from the virtual assistant.

19. The computer-readable memory of claim 15, wherein the given response is used to train the virtual assistant.

20. The computer-readable memory of claim 15, wherein tracking performance of the virtual assistant and the live agent during the chat session comprises tracking use by the live agent of the suggested response when the selected mode of operation is the live mode or the training mode.

* * * * *